Figure 1:
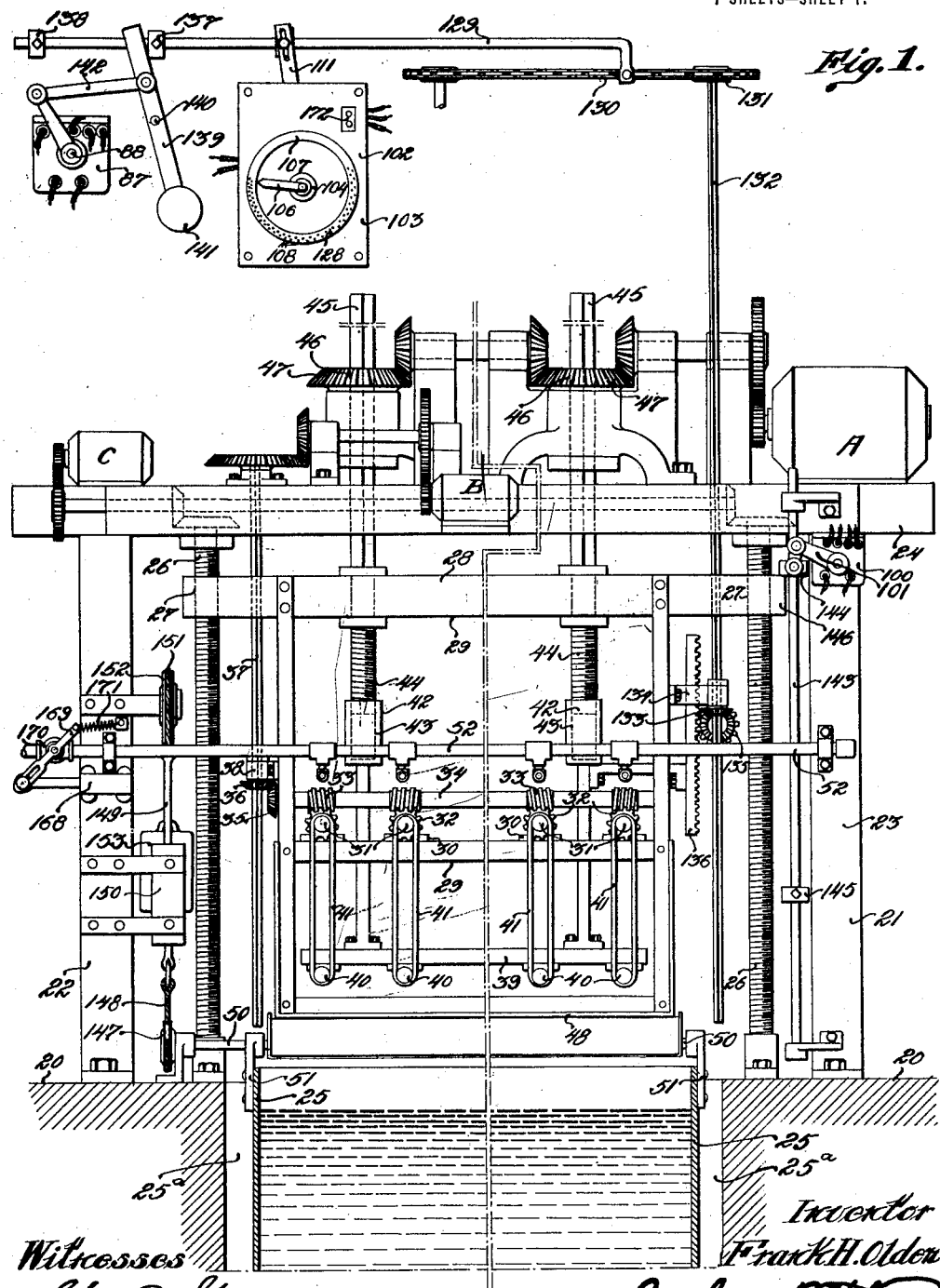

F. H. OLDEN.
CONTROLLING MEANS FOR MERCERIZING MACHINES.
APPLICATION FILED AUG. 17, 1921.

1,429,525. Patented Sept. 19, 1922.
7 SHEETS—SHEET 1.

Witnesses
Geo. A. Gruse
Augustus B. Coppes

Inventor
Frank H. Olden
By Joshua R. H. Potts
his Attorney

F. H. OLDEN.
CONTROLLING MEANS FOR MERCERIZING MACHINES.
APPLICATION FILED AUG. 17, 1921.
1,429,525.
Patented Sept. 19, 1922.
7 SHEETS—SHEET 2.
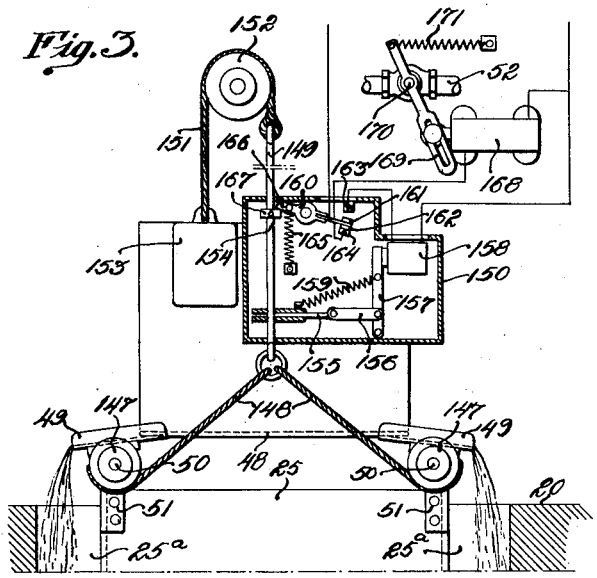
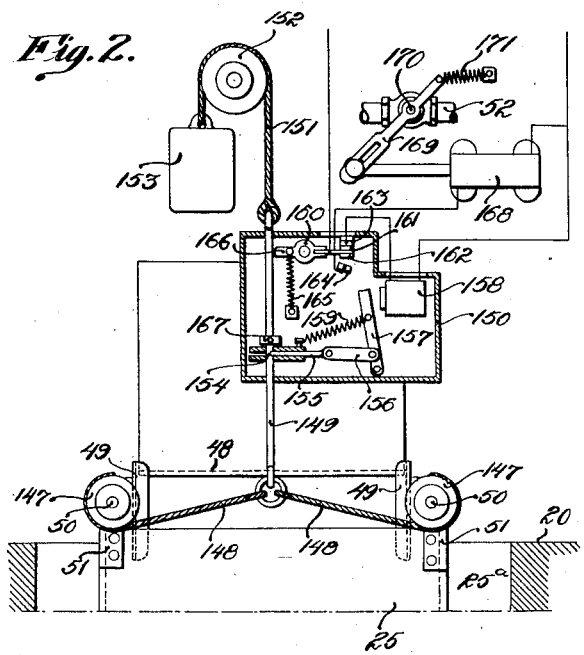
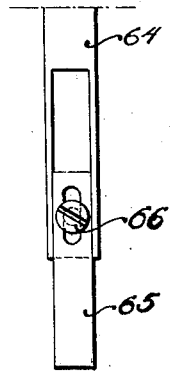

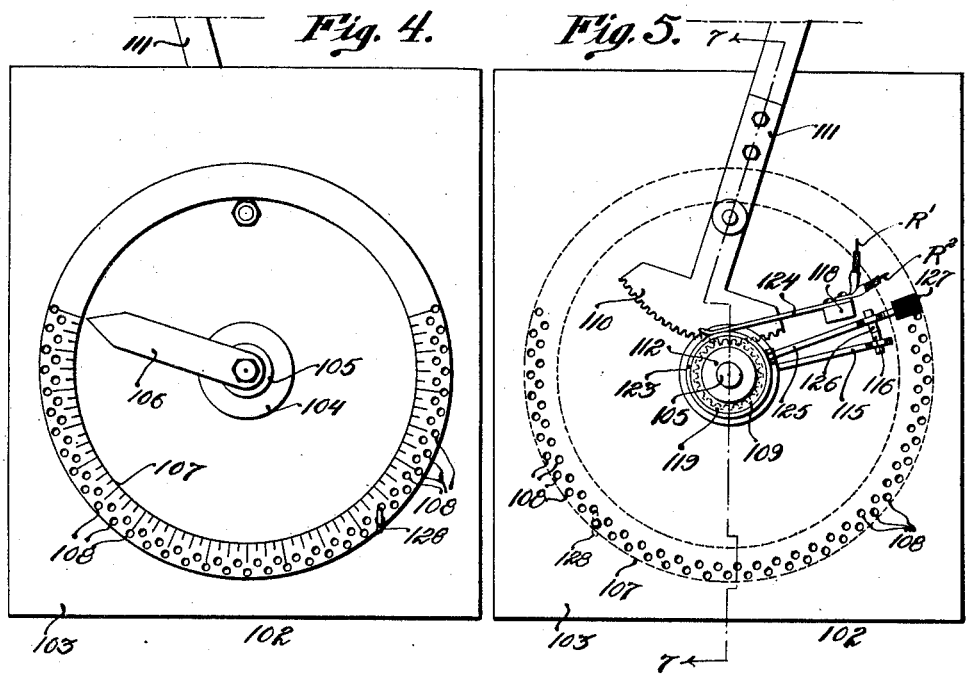
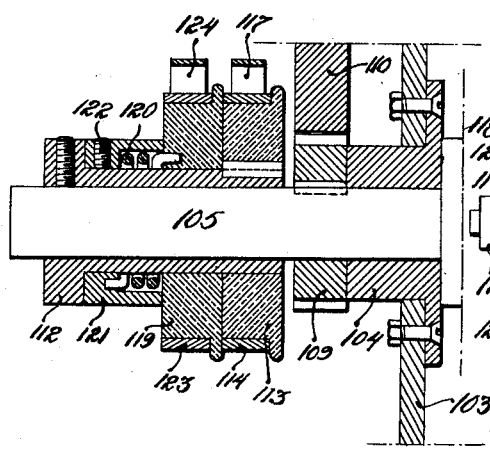
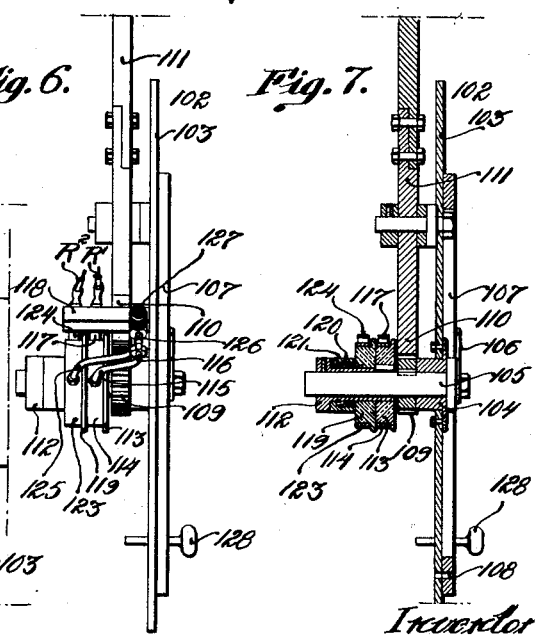

F. H. OLDEN.
CONTROLLING MEANS FOR MERCERIZING MACHINES.
APPLICATION FILED AUG. 17, 1921.
1,429,525.
Patented Sept. 19, 1922.
7 SHEETS—SHEET 4.
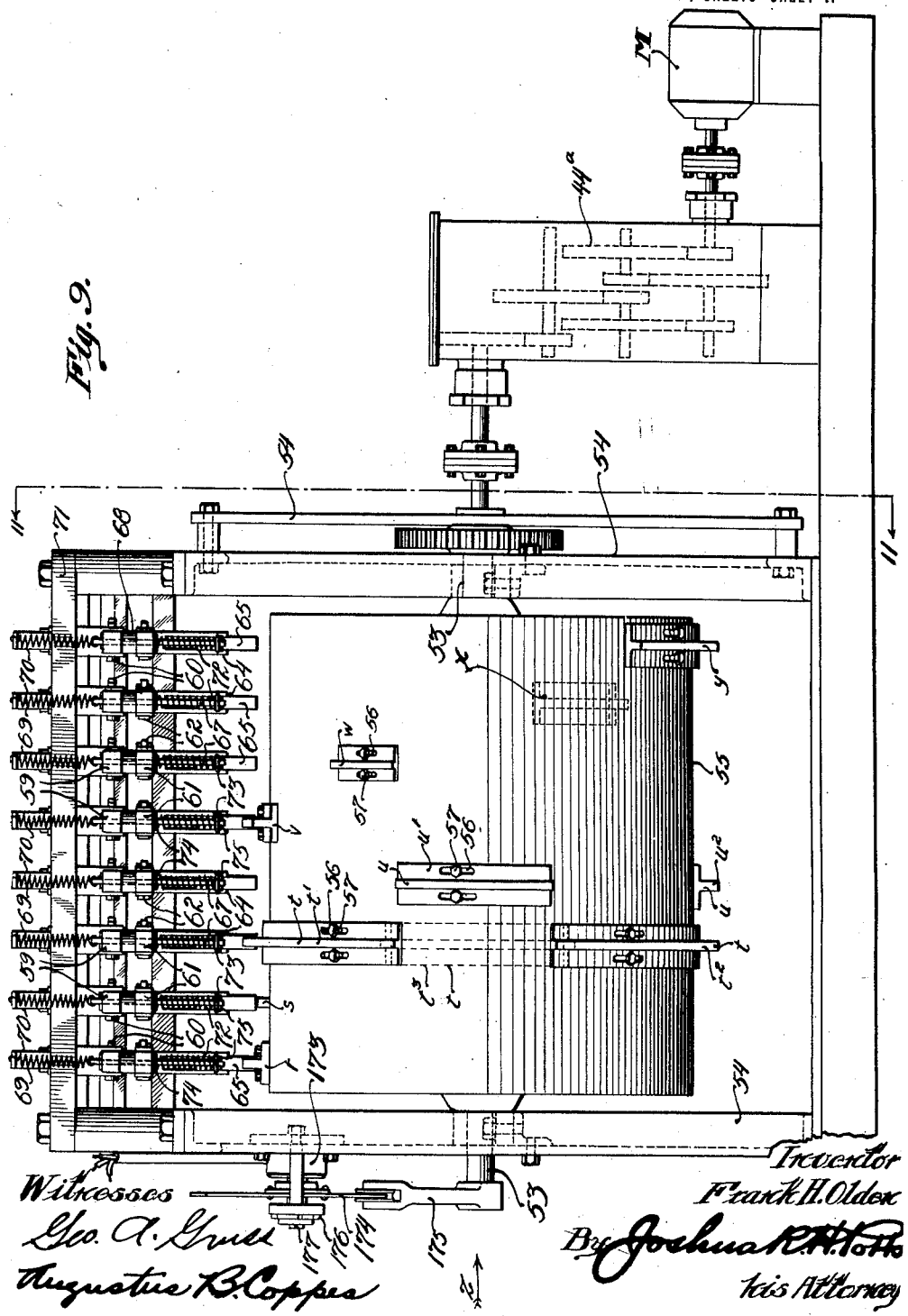

F. H. OLDEN.
CONTROLLING MEANS FOR MERCERIZING MACHINES.
APPLICATION FILED AUG. 17, 1921.
1,429,525.
Patented Sept. 19, 1922.
7 SHEETS—SHEET 5.
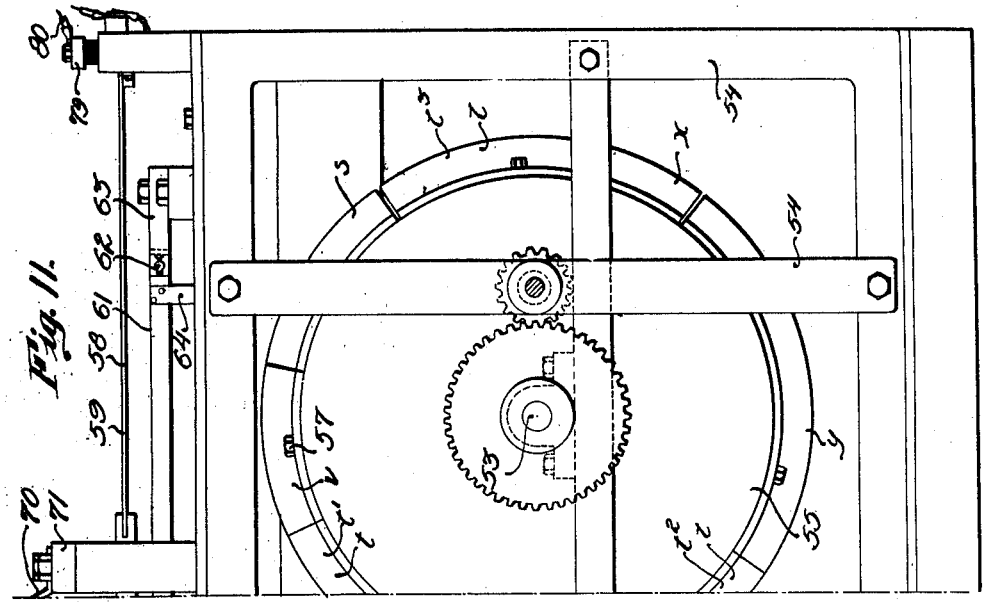
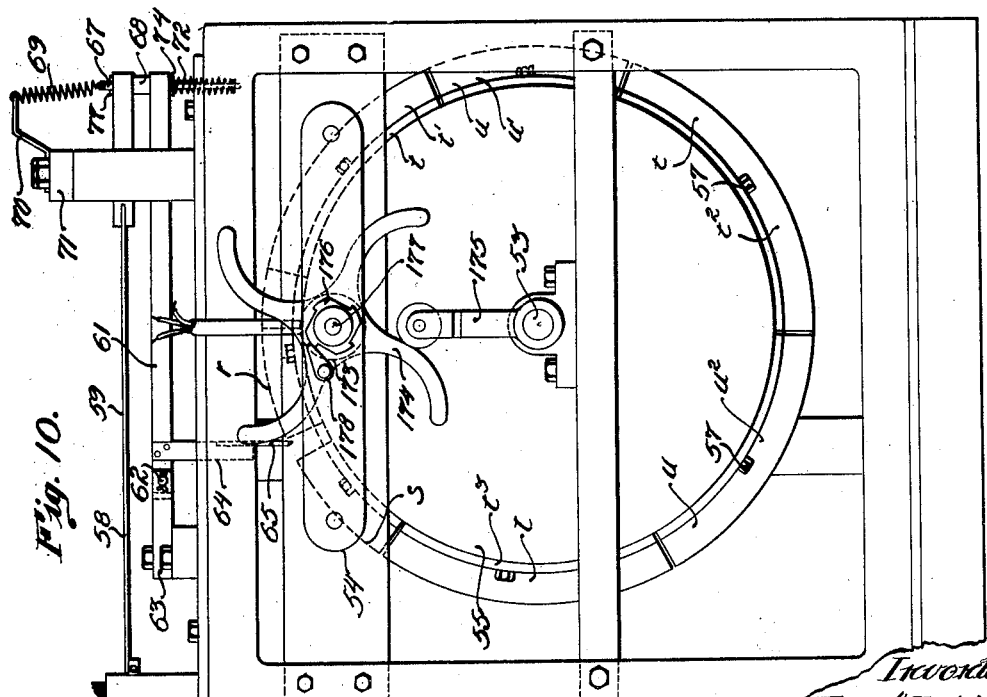

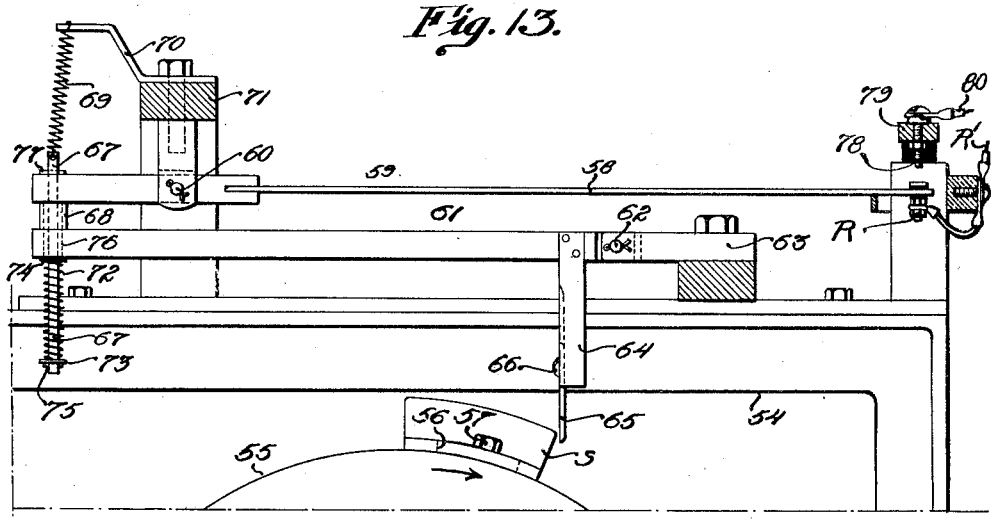
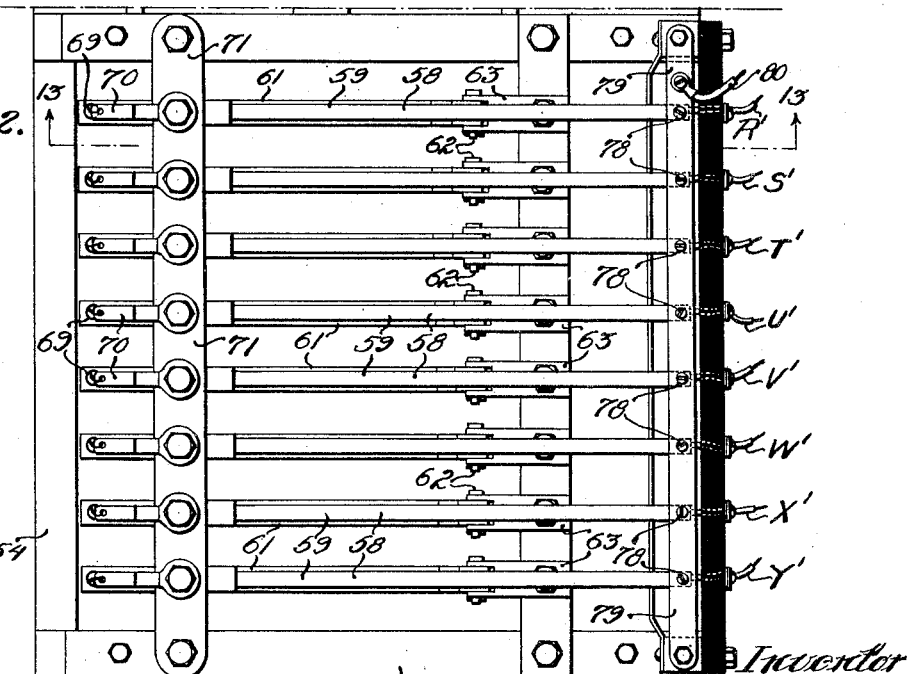

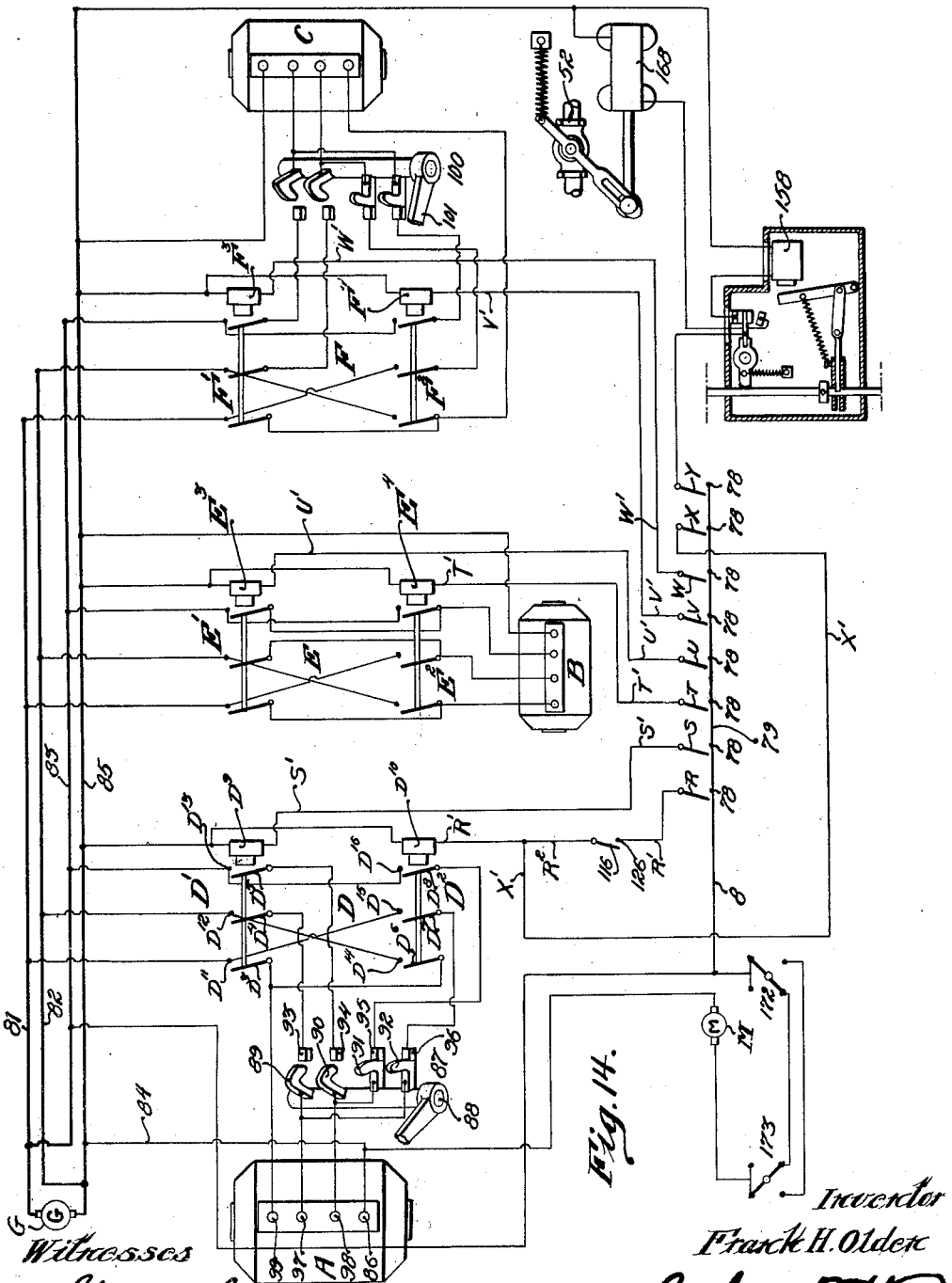

Patented Sept. 19, 1922.

1,429,525

UNITED STATES PATENT OFFICE.

FRANK H. OLDEN, OF CHESTER, PENNSYLVANIA.

CONTROLLING MEANS FOR MERCERIZING MACHINES.

Application filed August 17, 1921. Serial No. 492,906.

*To all whom it may concern:*

Be it known that I, FRANK H. OLDEN, a citizen of the United States, residing at Chester, county of Delaware, and State of Pennsylvania, have invented certain new and useful Improvements in Controlling Means for Mercerizing Machines, of which the following is a specification.

To insure the proper mercerizing of skein yarn, great care must be exercised so that the various steps of the process shall be properly carried out. In the mercerizing process the yarn must be placed under tension and stretched and subjected to a caustic solution after which the caustic solution must be removed from the yarn and the yarn must be washed. The above represents certain of the steps of the mercerizing process. However, these and other steps in the process must be properly timed otherwise the resulting mercerized yarn will be of an inferior character. Numerous instances are known where large quantities of yarn have been absolutely ruined due to the improper carrying out of the steps of the process as above outlined.

Various forms of machines have been made for the purpose of mercerizing skein yarn but no instance is known where the structure is capable of insuring the complete proper mercerizing process.

One object of my invention is to provide improved means which will automatically control the various movements of a mercerizing machine so as to insure the proper carrying out of the mercerizing process.

Another object is to so construct my improved apparatus that it will automatically control the feeding and shedding of the washing water so as to prevent the washing water from commingling with the caustic solution which would otherwise weaken the caustic solution so as to impair its action upon successive batches of yarn.

It is also well known that skeins of yarn often vary both as to the character of the yarn itself and also in regards to the sizes of the skeins.

Another object of my invention is to provide improved means which can be readily adjusted to suit skeins of yarn of various characters so that irrespective of the quality and sizes of the skeins, the proper tension and stretch can be applied during the mercerizing process.

Another object is to make the apparatus of my invention of a comparatively simple and durable construction so that it can be applied to machines known to the market with practically no change to the construction of the machine.

These objects, and other advantageous ends which will be described hereinafter, I attain in the following manner, reference being had to the accompanying drawings in which—

Figure 1 is a front elevation partly diagrammatic of the well known Smith and Drum type of mercerizing machine having my invention applied thereto; a portion of the machine being broken away and certain of the controlling means of my invention not being illustrated in this view of drawing, Figure 2 is a fragmentary cross sectional elevation showing certain of the features of my invention and illustrating them in a normal position, Figure 3 is a view of like character to that shown in Figure 2 showing the parts having been automatically moved into another position to effect the shedding of the washing water, Figure 4 is a front elevation of a dial and contact-breaking structure which forms a part of my invention, Figure 5 is a rear view of Figure 4, Figure 6 is an edge view of Figure 5, Figure 7 is a section taken on the line 7—7 of Figure 5, Figure 8 is an enlarged view of certain of the parts shown in Figure 7, Figure 9 is a side elevation of time-controlled electric circuit making and breaking mechanism which forms a part of my invention, Figure 10 is an end elevation of the structure shown in Figure 9 looking in the direction of the arrow z, Figure 11 is a fragmentary section taken on the line 11—11 of Figure 9, Figure 12 is a top plan view of the mechanism shown in Figures 9, 10, and 11, Figure 13 is an enlarged section taken on the line 13—13 of Figure 12, Figure 14 is a diagrammatic view showing the various electric circuits forming a part of my invention and for controlling the apparatus thereof, and Figure 15 is a fragmentary front elevation showing certain adjustable means on the contact making and breaking apparatus as illustrated in Figures 9 to 13 inclusive.

Referring to the drawings and particularly to Figures 1, 2 and 3, 20 represents a base support such for example as a floor upon which is securely mounted in a fixed position a main frame 21; said frame including uprights 22 and 23 and a transverse top beam structure 24. The base 20 is cut away to provide a cavity in which is mounted a tank 25 for containing the caustic solution used in the mercerizing process such for example as caustic soda.

In the form of machine as illustrated the top 21 supports three motors A, B, and C. For clearness of the description and operation, it may be here stated that these motors are preferably all two-phase reversible motors; the motor A being operative to apply and release tension on the skeins of the yarn; the motor B being operative to effect a turning in either direction of the skeins of yarn, and the motor C being operative to lower and raise the skeins into and out of the caustic solution.

The motor C is connected by gearing with two upright screws 26 which pass through the screw threaded holes 27 in a beam 28 of a supplemental frame 29 so that when the screws 26 are rotated in one direction due to the rotation of the motor C in one direction, the frame 29 will be lowered and when the screws are rotated in an opposite direction, due to the reversing action of the motor C, the frame 29 will be moved in an opposite direction. The frame 29 carries bearings 30 in which are rotatably mounted rollers 31. These rollers have worm wheels 32 connected thereto which mesh with worms 33 on a worm shaft 34. The worm shaft 34 has a bevel gear 35 thereon which meshes with a bevel gear 36 slidable on an angular shaft 37 but held against rotation thereon; said shaft 37 being rotatably mounted in the main frame 21 adjacent its top. The bevel gear 36 is rotatably mounted in a bearing 38 and is movable upwardly and downwardly in conjunction with the supplemental frame 29. It will be understood however that when the angular shaft 37 is rotated that it will rotate the bevel gear 36 and consequently the rollers 31 will be rotated in a direction according to the direction of rotation of the shaft 37.

The shaft 37 is geared to the motor B. Thus it will be understood that the rollers 31 are capable of rotation in either direction and are movable upwardly and downwardly due to the action of the frame 29.

An auxiliary frame 39 which constitutes the stretching or tensioning frame has rollers 40 mounted therein respectively below the rollers 31 and the skeins 41 of yarn are placed around the respective pairs of rollers 31 and 40 as clearly shown in Figure 1. The auxiliary frame 39 has portions 42 with screw threaded cavities 43 in which engage the lower ends of tensioning or stretching screws 44. These stretching screws are carried by the supplemental frame 29 and freely rotate therein. The upper ends of the screws 44 are made in the form of angular rods 45 which slidably fit within angular holes 46 of bevel gear wheels 47; said bevel gear wheels being rotatably supported on the main frame 21 and are geared to the motor A.

From the foregoing description it will be understood that by the turning of the screws 44 in one direction the auxiliary frame 39 and consequently the rollers 40 will be moved away from the rollers 31 and that the skeins of yarn 41 will be consequently stretched. It will also be understood that the skeins can be rotated due to the rotation of the rollers 31 and furthermore by the movement of the supplemental frame 29 due to the action of the screws 26 the supplemental frame 29 and auxiliary frame 39 can be raised and lowered so that the skeins of yarn 41 can be moved into and out of the caustic solution within the tank 25.

The bottom of the supplemental frame 29 includes a water shedding main plate 48 which when the supplemental frame is raised occupies a position over the top of the tank 25 as shown in Figure 1. Water shedding wing plates 49 have shafts 50 which are mounted in bearings 51 which may, as illustrated, be supported on the tank 25 and capable of being moved into a position from that shown in Figure 2 to that shown in Figure 3 so that when washing water, as will hereinafter be described, sprays downwardly from a pipe 52 so as to wash the skeins 41, said washing water after passing onto the main plate 48 will drain or shed over the wing plates 49 into the cavity 25ª surrounding the tank 25 so that this water will not mix with the caustic solution in the tank 25. The elements above specifically described do not in themselves constitute a part of my present invention since they are present in various forms on machines of different types such for example as the Smith and Drum machine above mentioned. The means which control the operation of said parts however form a part of my present invention and will now be described.

Referring now more particularly to Figures 9 to 13 inclusive a motor M is operatively connected with a shaft 53; any suitable gearing such as shown at 44ª in Figure 9 being interposed between the motor M and the shaft 53 so as to rotate the shaft 53 slowly to complete one full operation in a predetermined period. The shaft 53 is mounted in suitable bearings in a frame 54; said shaft 53 having secured thereto a timing drum 55; said drum being located within the confines of the frame 54.

Contact-making segments $r$, $s$, $t$, $u$, $v$, $w$, $x$ and $y$ are adjustably secured to the outer surface of the drum 55; said segments being spaced apart in the direction of the length of the drum and in the present instance consisting of plates having slots 56 through which securing bolts 57 extend into the drum. Certain of these segments, such for example as the segments $t$ and $u$ are made in sections spaced apart; the segment $t$ including three sections $t^1$, $t^2$ and $t^3$. The section $u$ includes two sections $u^1$ and $u^2$. It will be understood however that under various conditions that the number of these segments can be varied as can also the number of sections in which the segments are made.

A series of contacting members R, S, T, U, V, W, X and Y are respectively mounted on spring strips 58 of secondary levers 59. These secondary levers 59 are each independently pivoted as shown at 60 to a portion of the frame 54 as shown in Figure 13. A series of primary levers 61 are pivotally connected each independently of the other on pivots 62 which are mounted in extensions 63 of the frame 54. The primary levers have depending arms 64 to which are connected fingers 65. These fingers 65 are adapted to be engaged by the respective contact-making segments so as to effect the swinging movement of the primary levers 61 on their pivots 62 at various times during the operation of the apparatus. The fingers 61 as shown in Figure 15 are provided with slots through which screws 66 extend; said screws 66 being mounted in the arms 64. Thus the fingers 65 can be projected to various extents so as to increase or decrease the time in which the primary levers will be held in their rocked positions as will be more thoroughly comprehended from the following description.

It will be noted that the secondary levers 59 and the primary levers 61 are arranged in pairs with the secondary lever above the primary lever of each pair. Each pair of levers has a rod 67 slidable therethrough; there preferably being a spacing member 68 between the secondary lever and the primary lever of each pair as shown in Figure 13. Each of the rods 67 has a spring 69 secured to its top and to a bracket 70 on the top 71 of the frame 54. The rods 67 extend below the primary levers and have cushioning springs 72 thereon adapted to engage members such as washers 73 and 74 through which the rods 67 extend. Pins 75 support the washers 73 so that the springs 72 serve as a resilient connection between the primary levers and the rods 67; the washers 74 bearing on the upper ends of the springs and are preferably provided so as to permit comparatively large holes 76 to be formed in the primary levers through which the rods 67 extend so as to prevent any binding action during operation. Pins 77 extend through the rods 67 above the secondary levers 59 and when the fingers 65 are engaged by the segments to rock the primary levers the pins 77 will pull against the top surfaces of the secondary levers and thereby swing the latter so as to raise the various contacting members up into engagement with the contacts 78 which are in common connection with an electric contact bus bar 79. The contacts 78 are illustrated in the form of screws which are mounted in the bus bar 79 and depend respectively above the contacting members R, S, T, U, V, W, X and Y. The bus bar 79 forms a common electric ground for an electric feed wire 80 which may extend to one of the leads from any suitable source of electric current such for example as the generator G as shown in Figure 14. The various contacting members are connected by electric conduit wires $R^1$, $S^1$, $T^1$, $U^1$, $V^1$, $W^1$, $X^1$, and $Y^1$. It will be noted that during the rotation of the drum 55 the contact-making segments due to their engagement with the contact finger 65 will effect engagement between the respective contacting members and their contacts and this action, as will be hereinafter described, effects the completion of electric curcuits to operate the motors A, B and C at stated times with the result obvious from the construction of the mercerizing machine above described. Certain of said contacting members also act to effect the turning off and on of the washing water and to operate the water shedding wing plates.

By providing the spring 69 as shown in Figures 9 and 13 a quick break of the circuit is insured when the various contact-making segments pass their respective fingers 65. Thus even though the timing drum operates at a very slow speed a quick and dependable breaking of the electric circuits is assured.

In order to effect the reversing movements of the various motors A, B and C, which, as previously stated, are preferably of the two-phase type, I provide contactors which may be of a well known type such as the well known "General Electric" contactors which are diagrammatically represented in Figure 14 by the reference characters D, E and F which are respectively positioned in circuit with the motors A, B and C. For example the contactor D includes two switching sections $D^1$ and $D^2$ which have switching arms $D^3$, $D^4$ and $D^5$ and $D^6$, $D^7$ and $D^8$ respectively. The arms $D^3$, $D^4$ and $D^5$ are coupled together as a unit and are operative by an electromagnet $D^9$ while the contactor arms $D^6$, $D^7$ and $D^8$ are coupled together and adapted to be operated by an electromagnet $D^{10}$. The arms $D^3$, $D^4$ and $D^5$ are adapted to move, due to the energizing of the magnet $D^9$, into engagement with contacts $D^{11}$, $D^{12}$ and $D^{13}$; the contacts $D^{11}$ and $D^{12}$ being in electric connection by wires to the feed wires 81 and 82 which constitute one lead of the generator G. The contact $D^{13}$ is in electric connection with the wire 83 of a second lead of the generator G and a wire 84 connects the other wire 85 of said second lead with the connecting terminal 86 of the motor A. The arms $D^6$, $D^7$ and $D^8$ of the section $D^2$ of the contactor D when actuated by the electromagnet $D^{10}$ respectively engage contacts $D^{14}$, $D^{15}$ and $D^{16}$. The contact $D^{16}$ is connected by a wire to the contact $D^{13}$ and the contacts $D^{12}$ and $D^{14}$ are connected by a cross wire. In like manner the contacts $D^{11}$ and $D^{15}$ are connected by a cross wire. A limit switch 87 is interposed between the contactor D and the motor A. This limit switch is adapted to be moved by parts of the machine hereinafter described and in the form illustrated includes a rock shaft 88 having four shoes 89, 90, 91 and 92; the shoes 89 and 90 being arranged as a pair as are also the shoes 91 and 92. The shoes 89 and 90 are adapted, when the shaft 88 is moved in one direction, to respectively disengage contacts 93 and 94. On the other hand the shoes 91 and 92 disengage contacts 95 and 96 respectively when shaft 88 is moved in the opposite direction. The contact 93 is in electric connection with the arm $D^4$ and the shoes 89 and 92 are in electric connection with the contacting terminal 97 of the motor A. The contact 94 is in electric connection with the arm $D^5$ and the shoes 90 and 91 are in electric connection with the contacting terminal 98 of the motor A. The contact 96 is in electric connection with the arm $D^7$ and the arms $D^3$ and $D^6$ are in electric connection with the connecting terminal 99 of the motor A. It may be here stated that when the electromagnet $D^{10}$ is energized during a portion of the operation of the machine that the motor A will be rotated in one direction and, owing to the changing of poles between the sections $D^1$ and $D^2$ of the contactor D, when the electromagnet $D^9$ is energized the motor A will operate in an opposite direction. It will be also noted that the various shoes of the limit switch 87 are so constructed that at a certain time all can be in engagement with their respective contacts and that the shoes 89 and 90 or 91 and 92 can be moved out of engagement with their contacts. However, during the normal proper operation of the machine the shoes 91 and 92 are always in engagement with the contacts 95 and 96 and the shoes 89 and 90 are always in engagement with the contacts 93 and 94.

The motor B which as heretofore stated is operative for rotating the skeins of yarn through the medium of the rollers 31 and 40 is in connection with the contactor E; said contactor E being of similar construction to the contactor D and it is believed that further detail description is unnecessary; it being sufficient to state that the section $E^1$ of the contactor E is operative by an electromagnet $E^3$ and the section $E^2$ of the contactor E is operative by an electromagnet $E^4$; said electromagnets being alternately energized in a manner hereinafter described for effecting the reverse movements of the motor B. In similar manner the motor C is in connection with the contactor F, and the electromagnets $F^3$ and $F^4$ when energized, effect the operation of the sections $F^1$ and $F^2$ to operate the motor C in either direction. A limit switch 100 is interposed between the motor C and the contactor F and is operative by a lever 101; said lever being movable by mechanism hereinafter described.

A tension regulating device 102, as clearly shown in Figures 1 and 4 to 8 inclusive includes a supporting structure in the form of a plate 103 which provides a bearing 104 for a shaft 105. The shaft at its outer end is provided with an indicating pointer 106 adapted to traverse or register with graduations on a ring 107; said graduations being in alignment with holes 108 which extend entirely through the ring and also through the plate 103. A toothed pinion 109 is keyed to the shaft 105 and is adapted to be engaged by a toothed segment 110 on a lever 111; said lever being pivotally supported on the plate 103. A sleeve 112 is secured to the shaft 105 and upon the sleeve 112 is keyed a wheel 113 made of fiber or other material which is not a conductor of electricity. This wheel 113 has a metallic band 114 secured thereon from which projects an arm 115 having an electric contact 116 as clearly shown in Figures 5 and 6.

A contacting finger 117 is adapted to bear upon the band 114; said contacting finger being mounted on a supporting structure 118 which as illustrated is in the form of a lug which projects from the plate 103. A second wheel 119 which is also made of fiber or other non-conducting material is mounted on the sleeve 112 and is adapted to turn thereon against the action of a torsion spring 120; said torsion spring having one end secured to the wheel 119 and the other end secured to a collar 121; said collar being adjustably secured to the sleeve 112 by a set screw 122 as clearly shown in Figure 8. A metallic band 123 is secured on the wheel 119 and a contacting finger 124 which is mounted on the supporting lug 118 bears on the band 123. The band 123 has an arm 125 which is provided with a contact 126 normally in engagement with the contact 116 of the arm 115. The arm 125 is extended beyond the contact 126 and has secured thereto a piece of non-conducting material 127 which under certain conditions is adapted to engage a pin 128 which can be inserted through any of the holes 108.

The lever 111 as diagrammatically shown in Figure 1 is connected to a rod 129; said rod being connected to a chain 130 which passes over a sprocket wheel 131 on an angular shaft 132. This angular shaft extends through the hub of a bevel gear wheel 133 which is rotatably supported in a bearing 134 on the supplemental frame 29; it being noted that while the bevel gear is adapted to move lengthwise with respect to the shaft 132 that whenever said bevel gear wheel is rotated it will rotate the shaft 132. The bevel gear wheel 133 is geared to a pinion 135 which engages a toothed rack 136 on the auxiliary frame 39. Thus it will be noted that when the auxiliary frame moves downward with respect to the supplemental frame 29 that the shaft 132 will be rotated and the lever 111 will be swung to effect rotation of the shaft 105 and this action will occur during the stretching of the skeins of yarn 41. It will also be noted that when the piece 127 on the arm 125 engages the pin 128, which action will occur due to the movement of the lever 111 through the medium of the segment 110 and pinion 109, that the arm 125 will be stopped and the arm 115 will continue to move to separate the contacts 116 and 126. It will be noted therefore that the fingers 117, 124, the bands 114 and 123, the arms 115 and 125 and the contacts 116 and 126 constitute a switch which will be opened when the contacts 116 and 126 are separated.

The rod 129 has two collars 137 and 138 adjustably secured thereto and between these collars extends the end portion of a lever 139; said lever being pivotally supported at 140 and having a weight 141 at a position below its pivot. A link 142 pivotally connects the lever 139 with the shaft 88 of the limit switch 87. Thus when the rod 139 is moved according to the direction of rotation of the shaft 132, the collars 137 and 138 due to engagement with the lever 139 will move the lever and when released by the collars the weight 141 will move the switch into a position in which all the shoes 89, 90, 91 and 92 will be in engagement with their respective contacts.

The limit switch 100 has its lever 101 connected to an upright rod 143 which has collars 144 and 145 adjustably secured thereto and adapted to be engaged by an extending portion 146 of the supplemental frame 29 so that during the upward and downward movement of the supplemental frame the rod 143 will be moved in opposite directions and due to this action the limiting switch will be operated to effect the stopping of the motor C when the supplemental frame has been moved into its lowermost position and also when it has been moved into its uppermost position.

Considering the mechanism for controlling the turning on of the washing water and for shedding the washing water so that it will not enter the tank 25: the shafts 50 have grooved wheels 147 around which pass cables 148 which are attached to a lock rod 149; the upper end of the lock rod having a cable 151 which passes over a pulley 152. A weight 153 is connected to the cable 151 and serves to move the lock rod 149 upwardly to effect the movement of the wing plates 49 from the position shown in Figure 2 to the position shown in Figure 3. The lock rod 149 has a notch 154 adapted to be engaged by a slidable bolt 155 which is pivotally connected to a link 156. This link 156 is pivotally connected to an armature lever 157 which is normally kept in a position away from an electromagnet 158 by a spring 159. An electric contact lever 160 has two contacts 161 and 162 thereon adapted to be moved respectively into engagement with electric contacts 163 and 164. A spring 165 is normally operative to move and keep the contact 161 in engagement with the contact 163. The contact lever 160 has an extension 166 adapted to be engaged by a collar 167 on the lock rod 149 so that during the upward movement of the lock rod the collar 167 will engage the extension 166 and swing the lever 160 so that the contact 162 will engage the contact 164. The contact 164 is in electric connection with a solenoid 168 and the contact 163 is in electric connection with the magnet 158. The contact lever 160 is in electric connection with the contacting member Y by a wire Y¹ and the electromagnet 158 and solenoid 168 are in electric connection with the generator G through the medium of the wire 85. The solenoid 168 is in connection with a lever 169 which is connected to a valve 170 in the water pipe 52 so that when the solenoid 168 is energized it will swing the lever 169 and open the valve 170 allowing water to pass out of perforations in the pipe 52 so as to flow downwardly into engagement with the skeins of yarn 41. A spring 171 is connected to the lever 169 to effect the closing of the valve 170 when the solenoid 168 is de-energized. It will be noted that when the electromagnet 158 is energized it will attract the armature lever 157 and the movement of this lever will withdraw the bolt 155 from the notch 154 and the weight 153 will then move the rod 149 upwardly as above stated so that during the washing operation the wing plates will serve to shed the water into the cavity 25ª where it can be conducted away by any suitable drain (not illustrated).

A three-way starting switch 172 is in electric connection with the timing motor M and with another three-way switch 173; said switch 173 having a star wheel 174 thereon as clearly shown in Figure 10. An arm 175 on the shaft 53 of the timing drum 55 is adapted to engage the star wheel 174 so as to actuate the switch 173. The switch 173 is preferably made in the form of an ordinary three-way snap switch and I have illustrated a detent ratchet wheel 176 secured to the operating shaft 177 of the switch 173; said ratchet wheel being adapted to be engaged by a pawl 178 pivotally mounted on the frame 54. It will be understood that when the timing drum has completed one revolution in the form shown that the switch 173 will be operated to stop the motor M. It will be noted the contacts 116 and 126 when in engagement are in electric connection with the electromagnet $D^{10}$ and the contacting member R through the medium of the wires $R^1$ and $R^2$; the electromagnet $D^9$ being in contact with the contacting member S through the medium of the wire $S^1$; the contacting member T in connection with the electromagnet $E^4$ by the wire $T^1$; the contacting member U in connection with the electromagnet $E^3$ by the wire $U^1$; the contacting member V in connection with the electromagnet $F^4$ by the wire $V^1$ and the contacting member W in connection with the electromagnet $F^3$ by the wire $W^1$. The contacting member X is in connection with the electromagnet $D^{10}$ through the medium of the wire $X^1$. Also the contactors E and F are in electric connection with the leads of the generator G in the same manner as specifically described in connection with the contractor D.

Considering that the skeins of yarn to be mercerized are placed over the rollers 31 and 40 and that the tensioning device 102 is in the position shown in Figure 5 the pin 128 is inserted in one of the holes 108 according to the amount of initial stretch which the skeins of yarn are to receive. For example it can be predetermined to impart the most desirable initial stretch to the yarn. If it is desirable to stretch seven inches for example, the pin 128 can be inserted in the hole 108 which will allow for a stretch of seven inches before the insulating piece 127 moves into engagement with the pin 128. After the proper amount of initial stretch has been determined and the pin 128 placed within the proper hole 108 the switch 172 is then actuated to start the motor M and the drum 55 will then start to rotate. The contact-making segment $r$ will then operate to effect the engagement of the contacting member R with its contact 78 and the electromagnet $D^{10}$ will be energized to effect the rotation of the motor A in a direction to move the auxiliary frame 39 downward with respect to the supplemental frame 29 and the skein of yarn will be stretched. This downward movement of the auxiliary frame, due to the provision of the rack 136 and its connected parts, will operate the shaft 105 and both of the arms 115 and 125 will be moved with the contacts 116 and 126 in engagement with each other.

During the stretching movement, the contacting section $t^1$ of the segment $t$ will effect the movement of the contacting member T into engagement with its contact 78 and the electromagnet $E^4$ will be energized to effect the rotation of the motor B in a direction which will impart a rotatable movement to the rollers and skeins of yarn; said rotatable movement of the rollers and skeins, for example, being toward the right or clockwise viewed from Figure 1. The stretching operation continues until the arm 125 of the tensioning device is stopped due to the engagement of the piece 127 with the pin 128. The arm 115 however will continue to move and the contact 116 will separate from the contact 126 and thus the circuit will be opened through the electromagnet $D^{10}$ and the motor A will be stopped. The contact-making segment $v$ on the drum 55 then moves into operation to effect the movement of the contacting member V into engagement with its contact 78 and the electromagnet $F^4$ of the contactor F will then be energized to start the rotation of the motor C in a direction which will effect the movement of the supplemental frame 29 downward to move the skeins 41 into the caustic solution in the tank 25; the limiting switch 100 being actuated by the portion 146 of the frame 29 to stop the rotation of the motor C when the frame 29 has reached a position with the skeins entirely within the caustic solution. The contact-making segment $w$ after a predetermined time sufficient to allow the skeins to remain in the caustic solution for a desirable period, moves into position to effect the movement of the contacting member W into engagement with its contact 78 and cause the electromagnet $F^3$ to be energized and thereby start the motor C in a reverse direction to effect the raising of the supplemental frame 29. This action moves the skeins of yarn 41 upwardly out of the caustic solution and when the supplemental frame 29 reaches a position near its top it starts to actuate the limit switch 100 through the engagement of the part 146 with the collar 144 and the motor C is then stopped and the supplemental frame will remain in its raised position. After this action the section $t^1$ of the segment $t$ will move into an inoperative position to effect the de-energizing of the electromagnet $F^4$ to stop the motor B and then the section $u^1$ of the contact-making segment $u$ will operate to effect the movement of the contacting member U into engagement with its contact 78 and the electromagnet $E^3$ will be energized which action will start the rotation of the motor B toward the left or in a direction to effect a movement of the rollers 31 and 40 and skeins 41 in a reverse direction from that in which they were first rotated. This action, while the yarn is under tension, causes the major portion of the caustic solution which has saturated the yarn to be squeezed out.

After the section $u^1$ of the contact making segment $u$ passes its associated finger 65 the contacting member $U^1$ will be moved away from its contact 78 and the motor B will be stopped. Immediately after this action the section $t^2$ of the contact-making segment $t$ will operate to again move the contacting member T into engagement with its contact 78 and the electromagnet $E^4$ will be energized to again turn the motor B in a direction which will effect rotation of the rollers 31 and 40 and skeins 41 toward the right or in a clockwise direction so as to squeeze practically all of the caustic solution out of the yarn. During this latter turning movement of the rollers and skeins the contact-making segment $y$ moves into operation to effect movement of the contacting member Y into engagement with its contact 78 and an electric circuit will be completed through the lever 160, contacts 161 and 163 and the electromagnet 158. The electromagnet 158 will then be energized to move the armature lever 157 and the bolt 155 will be withdrawn from the notch 154 in the lock rod 149 and the weight 153 will then operate to swing the wing plates 49 from the position shown in Figure 2 to the position shown in Figure 3. When the lock rod 149 moves upwardly the collar 167 will move the lever 160 and the contact 162 will be moved into engagement with the contact 164 and the solenoid 168 will be energized to move the valve lever 169 and open the water valve 170 allowing water to pass from the pipe 52 and thereby wash the skeins of yarn; the water draining from the yarn and also any other portion of the water which does not strike the skeins of yarn will fall downwardly and engage either the top surface of the main plate 48 or the wing plates 49 and this water will then be shedded into the cavity $25^a$ as above stated. The wing plates 49 will remain in this position until the next operation of the machine when the lowering of the supplemental frame 29 will swing the wing plates into the position as shown in Figure 2. This action will also cause the lock rod 149 to be lowered and the spring 159 will move the bolt 155 into locking engagement with the rod 149.

After the contact-making segment $y$ moves into an inoperative position the contacting member Y will move out of engagement with its contact 78 and the electric circuit will be broken and the solenoid 168 de-energized permitting the spring 171 to move the valve 170 into its closed position; thereby cutting off the water.

Before the water has been turned off the section $t^2$ of the contact-making segment $t$ moves into an inoperative position to effect the de-energizing of the magnet $E^4$ and the motor B is stopped. Immediately after this action the section $u^2$ of the contact-making segment $u$ moves into operative position to effect the movement of the contacting member U into engagement with its contact 78 and the electromagnet $E^3$ is again energized to effect the turning of the motor B to the left and thereby effect a rotation of the rollers and skeins in a contra-clockwise direction. During this rotation of the rollers and skeins the contact-making segment $x$ moves into operative position to effect the movement of the contacting member X into engagement with its contact 78 and the electromagnet $D^{10}$ is energized so as to effect operation of the motor A to impart an additional stretch to the skeins of yarn. The contact-making segment $x$ then moves into an inoperative position and the contacting member X then moves away from its contact 78 and the magnet $D^{10}$ is de-energized; thereby stopping the motor A. The section $u^2$ of the contact-making segment $u$ then moves into an inoperative position and the contacting member U is moved out of engagement with its contact 78 and the motor B is stopped. The section $t^3$ of the contact-making segment $t$ then moves into operation to again cause the contacting member T to engage its contact 78 and the electromagnet $E^4$ is again energized to effect the rotation of the motor B in an opposite direction so that the rollers 31 and 40 and skeins 41 will be rotated in an opposite direction.

During this latter action the water is turned off as above stated and during a continuation of the turning of the skeins the water will be squeezed and will drain therefrom after which the section $t^3$ of the contact-making segment $t$ will be moved into an inoperative position and the contacting member T will move out of engagement with its contact 78 and the motor B will stop. The contact-making segment $s$ will then move into a position to effect the engagement of the contacting member S with its contact 78 and the electric magnet $D^9$ will then be energized to effect the rotation of the motor A in an opposite direction so as to move the auxiliary frame upward with respect to the supplemental frame 29 and the tension on the yarn will be released. The auxiliary frame during its raising movement then actuates the limit switch 87 to stop the motor A and the skeins can then be removed from the rollers. After this tension releasing action the arm 175 on the drum shaft 53 will actuate the star wheel 174 and thereby actuate the switch 173 to stop the timing motor M and the operation is completed.

Thus with my improved apparatus I can accurately and positively time the various steps in the operation of a machine and can readily vary the initial stretch by merely placing the pin 128 in the various holes 108. Furthermore it will be understood that practically any character of movement can be imparted during the mercerizing process both in regards to stretching and rotation of the skeins. The various contact-making segments can be adjusted to suit different conditions according to the character of the yarn as is obvious from the construction described and illustrated.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. The combination with a yarn mercerizing machine including means operative to stretch said yarn, of a device including means adjustable into predetermined positions to allow movement of said stretching means to different extents and to effect the stopping of said stretching means after having moved to said extents whereby stretches differing in length can be imparted to said yarn; substantially as described.

2. The combination with a yarn mercerizing machine including means operative to stretch said yarn, of a device including means adjustable into predetermined positions to allow initial movement of said stretching means to different extents and to effect the stopping of said stretching means after having moved to said extents whereby stretches differing in length can be imparted to said yarn; substantially as described.

3. The combination with a yarn mercerizing machine including means operative to stretch said yarn and a motor operatively connected to said stretching means, of a device including means movable in conjunction with said stretching means and carrying contacts which when in engagement effect an electric circuit through said motor to operate the same, and means adjustable to separate said contacts at a desired time whereby said motor will be stopped; substantially as described.

4. The combination with a yarn mercerizing machine including means operative to stretch said yarn and a motor operatively connected to said stretching means, of a device including means movable in conjunction with said stretching means and carrying contacts which when in engagement effect an electric circuit through said motor, a supporting structure, and means adapted to be adjustably positioned on said supporting structure to stop movement of one of said contacts and allow movement of the other contact into a position to stop said motor; substantially as described.

5. The combination with a yarn mercerizing machine including means operative to stretch said yarn and a motor operatively connected to said stretching means, of a device including means movable in conjunction with said stretching means and carrying contacts which when in engagement effect an electric circuit through said motor, a supporting structure having holes spaced apart, and means adapted to be inserted within any of said holes to stop movement of one of said contacts and allow movement of the other contact into a position to stop said motor; substantially as described.

6. The combination with a yarn mercerizing machine including means operative to stretch said yarn and a motor operatively connected to said stretching means, of a device including a shaft movable in conjunction with said stretching means; an indicating pointer connected to said shaft; means providing graduations for registration with said pointer; means movable in conjunction with said stretching means for turning said shaft; means operatively connected to said shaft and having contacts thereon which when in engagement effect an electric circuit through said motor to operate the same; and means adjustable with respect to said graduations to separate said contacts at a desired time whereby the motor will be stopped; substantially as described.

7. The combination with a yarn mercerizing machine including means operative to stretch said yarn and a motor operatively connected to said stretching means, of a device including a shaft movable in conjunction with said stretching means; two wheels; means for connecting one of said wheels to receive a positive movement of said shaft; means for resiliently connecting the other of said wheels to the shaft; electric conductor bands on said wheels; electric conducting fingers frictionally bearing on said band; arms connected to said bands; contacts respectively carried by said arms and resiliently held in engagement with each other due to the resilient connection between said second wheel and the shaft; and means adapted to be adjustably mounted in various radial positions relatively to the axis of the shaft and serving as a stop for the arm of said resiliently connected wheel whereby during rotation of the shaft, said latter arm and its contact will be stopped and the other of said arms will be moved to separate its contact from the other contact, said conductor fingers being included in electric circuit with said motor; substantially as described.

8. The combination with a yarn mercerizing machine including means operative to stretch said yarn, of a device including means adjustable into predetermined positions to allow movement of said stretching means to different extents and to effect the stopping of said stretching means after having moved to said extents whereby an initial stretch of any of a number of different lengths can be imparted to said yarn; means for chemically treating said yarn while under the tension of said initial stretch; and means for imparting an additional stretch to said yarn after being chemically treated; substantially as described.

9. The combination with a yarn mercerizing machine including means operative to stretch said yarn and a motor operatively connected to said stretching means, of a device including means adjustable into predetermined positions to allow initial movement of said stretching means to different extents and to effect the stopping of said motor after the stretching means has thus been moved; means for chemically treating said yarn when under tension of said initial stretch; and independent means for operating said motor to apply an additional stretch to said yarn after being chemically treated; substantially as described.

10. The combination in a mercerizing machine of movable water shedding means; means connected with said water shedding means and including a lock rod; a bolt movable into locking engagement with said rod; means for moving said rod when said bolt is withdrawn to effect movement of said shedding means into an operative position; time-controlled means; and means automatically operative through the medium of said time-controlled means for withdrawing said bolt; substantially as described.

11. The combination in a mercerizing machine of movable water shedding means; means connected with said water shedding means and including a lock rod; a bolt movable into locking engagement with said rod; means for moving said rod when said bolt is withdrawn to effect movement of said shedding means into an operative position; time-controlled means; an electromagnet; an armature lever for said magnet and connected to said bolt; and means operative through the medium of said time-controlled means for energizing said magnet to cause movement of said armature lever to withdraw said bolt from locking engagement with the rod; substantially as described.

12. The combination in a mercerizing machine of movable water shedding means; means connected with said water shedding means and including a lock rod; a bolt movable into locking engagement with said rod; means for moving said rod when said bolt is withdrawn to effect movement of said shedding means into an operative position; time-controlled means; an electromagnet; an armature lever for said magnet and connected to said bolt; means operative through the medium of said time-controlled means for energizing said magnet to cause movement of said armature lever to withdraw said bolt from locking engagement with the rod; a wash water conduit; a valve therein; a solenoid operatively connected to said valve; and means for effecting the energizing of said solenoid after said shedding means is moved into operative position; substantially as described.

13. The combination in a mercerizing machine of movable water shedding means; means connected with said water shedding means and including a lock rod; a bolt movable into locking engagement with said rod; means for moving said rod when said bolt is withdrawn to effect movement of said shedding means into an operative position; time-controlled means; an electromagnet; an armature lever for said magnet and connected to said bolt; means operative through the medium of said time-controlled means for energizing said magnet to cause movement of said aramture lever to withdraw said bolt from locking engagement with the rod; a wash water conduit; a valve therein; a solenoid operatively connected to said valve; and means for effecting the energizing of said solenoid after said shedding means is moved into operative position, said latter means including a lever having a portion movable by said lock rod, said lever having an electric contact thereon operative when the lever is moved by the lock rod to effect said energizing of the solenoid; substantially as described.

14. The combination in a mercerizing machine of movable water shedding means; means connected with said water shedding means and including a lock rod; a bolt movable into locking engagement with said rod; means for moving said rod when said bolt is withdrawn to effect movement of said shedding means into an operative position; time-controlled means; an electromagnet; an armature lever for said magnet and connected to said bolt; means operative through the medium of said time-controlled means for energizing said magnet to cause movement of said armature lever to withdraw said bolt from locking engagement with the rod; a wash water conduit; a valve therein; a solenoid operatively connected to said valve; means for effecting the energizing of said solenoid after said shedding means is moved into operative position, said latter means including a lever having a portion movable by said lock rod, said lever having an electric contact thereon operative when the lever is moved by the lock rod to effect said energizing of the solenoid; means operative by said time-controlled means for de-energizing said solenoid; and means automatically operative to close said valve when the solenoid is de-energized; substantially as described.

15. The combination with a yarn mercerizing machine of electrically operated means for operating said machine and time-controlled means, for said operating means of the machine, including a time-controlled member, primary and secondary levers operatively connected together, means operative by said member for moving the primary levers; contacting members carried by said secondary levers; contacting means; means on said time-operated member for moving said levers whereby the contacting members will be moved into engagement with said contacting means; and means in electric circuit with said contacting members and contacting means to control the operation of the electric operating means of the machine; substantially as described.

16. The combination with a yarn mercerizing machine of electrically operated means for operating said machine and time-controlled means, for said operating means of the machine, including a time-controlled member, primary and secondary levers operatively connected together, means operative by said member for moving the primary levers; contacting members carried by said secondary levers; contacting means; means on said time-operated member for moving said levers whereby the contacting members will be moved into engagement with said contacting means; means in electric circuit with said contacting members and contacting means to control the operation of the electric operating means of the machine; and springs operative to move said levers when released by means on said time-operated member whereby said contacting members will be quickly moved out of engagement with said contacting means; substantially as described.

In testimony whereof I have signed my name to this specification in the presence of two subscribing witnesses.

FRANK H. OLDEN.

Witnesses:
   HELEN R. GUNNING,
   G. W. HERRICK, Jr.